United States Patent
Mitrakis et al.

(10) Patent No.: US 9,224,244 B2
(45) Date of Patent: Dec. 29, 2015

(54) PARAMETERIZED GRAPHICAL REPRESENTATION OF BUILDINGS

(71) Applicant: Harman Becker Automotive Systems GmbH, Karlsbad (DE)

(72) Inventors: Stavros Mitrakis, Kirchheim (DE); Marek Strassenburg-Kleciak, Garching bei Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 324 days.

(21) Appl. No.: 13/672,288

(22) Filed: Nov. 8, 2012

(65) Prior Publication Data

US 2013/0113797 A1    May 9, 2013

(30) Foreign Application Priority Data

Nov. 8, 2011  (EP) .................................... 11188154

(51) Int. Cl.

| | |
|---|---|
| *G06T 17/10* | (2006.01) |
| *G06F 17/30* | (2006.01) |
| *G01C 15/00* | (2006.01) |
| *G01C 21/36* | (2006.01) |
| *G06F 17/50* | (2006.01) |
| *G06T 17/05* | (2011.01) |

(52) U.S. Cl.
CPC ............... *G06T 17/10* (2013.01); *G01C 15/00* (2013.01); *G01C 21/3638* (2013.01); *G06F 17/30289* (2013.01); *G06F 17/5004* (2013.01); *G06T 17/05* (2013.01); *G06F 2217/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0075718 | A1* | 4/2006 | Borne et al. | ............... 52/745.02 |
| 2006/0152503 | A1 | 7/2006 | Lee et al. | |
| 2008/0221843 | A1* | 9/2008 | Shenkar et al. | ................... 703/1 |
| 2010/0198563 | A1 | 8/2010 | Plewe | |

FOREIGN PATENT DOCUMENTS

DE      102006013299      9/2007

OTHER PUBLICATIONS

Kada, "The 3D Berlin project", Photogrammetric Week 2009, Sep. 2009, pp. 331-340.
Marvie et al., "Remote Interactive Walkthrough of City Models Using Procedural Geometry", version 1, inria-00071698, Jul. 2003, pp. 1-32.

* cited by examiner

Primary Examiner — Leon T Cain, II
(74) Attorney, Agent, or Firm — O'Shea Getz P.C.

(57) ABSTRACT

The invention relates to generating a three-dimensional (3D) graphical representation of a building. The method comprises establishing appearance control data comprising information on parameterized architectural features of the building and on building blocks which are fragments indicative of the building, and retrieving template data from a database based on references in the appearance control data, wherein the template data relates to a prefabricated graphical representation of the building blocks. The method further comprises, for each building block, calculating a 3D graphical representation of the building block based on the respective template data and the appearance control data, and combining the 3D graphical representations of the building blocks based on the appearance control data to generate the 3D graphical representation of the building.

15 Claims, 10 Drawing Sheets

PARAMETERIZED GRAPHICAL REPRESENTATION OF BUILDINGS

CLAIM OF PRIORITY

This patent application claims priority from EP Application No. 11 188 154.6 filed Nov. 8, 2011, which is hereby incorporated by reference.

FIELD OF TECHNOLOGY

This invention relates to a vehicle navigation system that generates a three-dimensional graphical representation of a building, also to generating a database containing appearance control data comprising information on parameterized architectural features.

RELATED ART

Navigation using electronic maps has become more and more popular during the recent years. Electronic maps are used for example in vehicle navigation systems to provide a user with guidance and orientation while driving a vehicle. In particular, two-dimensional (2D) or three-dimensional (3D) electronic maps can be furnished with graphical representations of buildings. 3D models of buildings such as landmarks or points of interest (POI) have been provided within electronic maps in order facilitate orientation of the user. Because a graphical representation of the building is recognizable to the user, the user is supported in linking the visual impressions while driving with the graphical representations of the electronic map.

However, the provisioning of 3D models as graphical representations of buildings has been limited to a small number of buildings due to several reasons.

A first reason is that 3D models are generated based on different techniques, e.g., in the form of surface models or parameterized models (CSG models). CSG models use Boolean operations and are typically used in mechanical engineering or aircraft engineering. Such generation of 3D models based on basic geometrical shapes requires a large manual effort. Each model is typically generated by a 3D designer in an individual process. The designer tries to generate a 3D model which represents the real building in an accurate way. Because such a process is costly and time consuming, the generation of 3D models has typically been limited to prominent landmarks within cities.

Another reason is that storing a 3D model based on polygons or a CSG model requires significant memory. If a large number of models is stored, memory requirements become difficult to meet.

Another reason is that limited computational resources (e.g., within a vehicle navigation device) require to limit the number of basic geometrical shapes which are simultaneously depicted. Typically, a graphical processor (GPU) calculates the 3D model. If a large number of 3D models is calculated, the limited computation resources may restrict the amount of polygons used for each 3D model. The limited amount of polygons requires the generalization of the models. In this context generalization means that certain features of a building are omitted from the 3D model. However, there are no guidelines for the generalization. The type and amount of generalization is then within the scope of discretion of the 3D designer. Therefore, the generalization may differ from building to building based on the subjective impression of the 3D designer. As a result, an electronic map comprising models of buildings may have an inconsistent impression to the user. Buildings may be represented in an arbitrary and inharmonic manner.

A further reason is that in order to generate a model for a building, it is typically necessary to obtain aerial photographs and additionally data from, e.g., high-resolution images on the ground. The acquisition of such data requires large efforts. This makes the generation of 3D models costly.

Yet a further reason is that, because the generation of 3D models is an individual process performed by individual 3D designers, errors such as wrong assembly of basic geometrical shapes, e.g., polygons, or the usage of intersecting or falsely assembled polygons occurs. Due to the amount of 3D models, verification of integrity is costly and time consuming.

All these reasons cause that generation of models is mostly restricted to urban areas and, possibly, prominent individual landmarks or POIs outside urban areas. In particular, 3D models in small cities or villages may not be provided, because the acquisition of image data is too costly.

Accordingly, there is a need for a better way of generating a graphical representation of a building with a high recognition value to a user.

SUMMARY OF THE INVENTION

According to an aspect of the invention, a method of generating a three-dimensional (3D) graphical representation of a building is provided. The method comprises establishing appearance control data that includes information on parameterized architectural features of the building and on building blocks, which are fragments of the building. Template data is retrieved from a database based on references in the appearance control data, wherein the template data relates to a prefabricated graphical representation of the building blocks. For each building block, a 3D graphical representation of the building block is calculated based on the respective template data and the appearance control data. 3D graphical representation of the building blocks are combined based on the appearance control data to generate the 3D graphical representation of the building.

By establishing appearance control data which comprises information on parameterized architectural features of the building and its building blocks, a robust and relatively inexpensive way of providing a 3D graphical representation which results in a high recognition value of a building is provided. Rather than generating a 3D graphical representation based on basic geometric shapes, such as polygons, the graphical representation of the building is generated from building blocks which relate to the basic architectural features, e.g., the ground floor, the roof, etc. The prefabricated graphical representation of the building blocks ensures fast and fail-safe generation of the graphical representation of the building.

Moreover, the number of building blocks is inherently limited and one building block may be used for the calculation of many graphical representations of different buildings. Therefore, the memory requirements can be significantly reduced if compared to a case where for each building all information is saved. For example, conventionally for every graphical representation of a building all information in the form of, e.g., polygons of a 3D model may be saved individually. According to the aspect, however, only references indicating a certain building block/template data may be needed to be saved individually for different graphical representations. The amount of memory required can be significantly reduced.

In this sense, a graphical representation of the building may not relate to a one to one electronic reproduction of the building, but rather may relate to a graphical representation which comprises relevant architectural features which are necessary for a user to recognize the graphical representation of a certain building.

Moreover, because each graphical representation of a building relates to the same set of basic building blocks, the 3D graphical representations of the different buildings are standardized and harmonized. Conventionally, different graphical representations may be generated by different 3D designers. Different 3D designers may use different guidelines or interpret formal architectural features differently. This results in an irregular generation of graphical representations which are, moreover, greatly influenced by the draftsman. According to an aspect of the invention, a more harmonic set of graphical representations may be obtained by providing a prefabricated set of building blocks and template data.

In particular, the computational efforts needed to calculate, e.g., by a GPU, the 3D graphical representation from the template data is reduced, because the template data already relates to the graphical representation of the building blocks. Then it is only necessary to calculate a limited, and for example optimized, amount of 3D graphical representation of the building blocks after which the building blocks are combined in order to form the graphical representation of the whole building.

For example, the appearance control data may comprise at least the following information: number of building blocks used for the 3D graphical representation and type information of the building blocks referencing the template data.

Here in particular, the type information may relate the building blocks to a fragment of the building selected from the group comprising: ground floor, roof, tower, building extension.

Therefore, for different buildings the appearance control data may comprise different information on the number and type of building blocks. For example, typically a cathedral may comprise a different number and different types of building blocks if compared to, e.g., a residential house in a suburban area. While the latter may comprise only building blocks relating to a ground floor and a roof, a cathedral may comprise building extensions, several towers, a ground floor and different roof shapes.

In particular, the different template data may be provided for building blocks with different type information. For example, template data with type information "ground floor" may have a different form or shape than template data with the type information "tower".

Here in particular, the appearance control data may always contain at least one building block with a type information relating to ground floor. The ground floor may be a basic building block for many buildings. Therefore, it may be required that any building contain a building block with a type information ground floor, which is, e.g., used as a reference building block.

Moreover, the appearance control data may comprise information for at least one building block selected from a group comprising: width, depth, height, color, texturing, rotation, symmetry, relative position to other building blocks, geographical position. Such information can be used to adapt and assemble the different building blocks. For example, by specifying the width, depth, and height of a certain building block, the certain building block may be adapted in its size based on the real life counterpart in order to provide the best graphical representation of the real building. Also, specific color and/or texturing may increase the recognition value for user.

The rotation, symmetry, and relative position to other building blocks may be used when combining the 3D graphical representations of the building block based on the appearance control data in order to generate the 3D graphical representation of the building. The geographical position of the building block contained in the appearance control data may relate to the actual geographical position of the building. For example, if a ground floor as outlined above serves as a reference building block, the ground floor may specify the geographical position of the building. The other building blocks may then be arranged using relative position values defining the relative position with respect to the ground floor.

Moreover, the template data may be selected from the group comprising: two-dimensional shapes, 3D models. While in certain cases it may be desired to provision the template data in the form of 3D models, in other cases it may desired to provision the template data in the form of two-dimensional shapes. For example, in the case the type information of a building block relates to "tower", the template data may be in the form of a 3D model of the tower.

For example, in the case of churches: churches within the same geographical area which have been built during the same period of time may have very similar appearances of their towers (e.g., "gothic style" or "baroque style"). This is referred to as the formal language of architectural features. It may therefore be feasible to provision the template data in the form of 3D models of a certain and limited number of tower shapes. Then a high recognition value to a user may be achieved by selecting the template data which most closely matches the real appearance of the tower and optionally further modify the graphical appearance, e.g., via texturing, of the towers. In this sense, the generation of three-dimensional graphical representation may not relate to generating a one to one electronic copy of the building, but may relate to generating a parameterized graphical representation of the building which has a high recognition value to the user. This is achieved by using appearance control data comprising information on the parameterized architectural features (rather than on basic geometrical building blocks such as polygons etc.).

However, as outlined above, the template data may also be provided in the form of two-dimensional shapes. Then calculating the 3D representation of a building block may comprise, based on the appearance control data, rendering a 3D model of the building block by extruding the two-dimensional shape of the respective template data, which is referenced by the appearance control data. In this context, extruding may refer to generating a 3D shape using a 2D shape as base area.

Calculating the 3D graphical representation of a building block may further comprise, based on the appearance control data, at least one operation performed on a 3D model of that building block which is selected from the group comprising: scaling, rotating, skewing, coloring, and texturing. By performing such an operation, a 3D model of a building block may be further adapted in order to increase the recognition value to a user.

Then, combining the 3D graphical representation of the building blocks may comprise arranging and attaching the 3D models of the building blocks to each other based on the appearance control data. Once the 3D models for the different building blocks are obtained as outlined above, the 3D graphical representation of the building itself may be obtained by combining and arranging the building blocks with respect to each other. The information on how to combine and how to arrange the different building blocks may be contained within the appearance control data. For example, the appearance control data may comprise the information on the relative position of the different building blocks with respect to each other or, e.g., with respect to a ground floor. Then, for example, it may be possible to attach the towers to the outside of a ground floor and attach the roof to the top of the ground floor. From this, for example, an entire church may be assembled by combining the graphical representations of the different building blocks, such as for example, the ground floor, the towers, and the roof.

Moreover, combining the 3D graphical representation of the building blocks may further comprise, based on the appearance control data, at least one operation performed on a 3D model of said building which is selected from the group comprising: scaling, rotating, skewing, coloring and texturing.

Moreover, the appearance control data may be established based on elements selected from the group comprising: type of building, architectural classification of the building, geographical position of the building, and image data. For example, when a graphical representation of a church is desired, it may be possible to establish the appearance control data only based on low resolution image data combined with the architectural classification of the building and the geographical position of the building. For example, if it is known that the building is a gothic church located in the northern part of Italy, few image data may be used to verify that the church has two towers, one transept, and one apsis (as may be typical for churches of this period). For example, the appearance of the roof may be obtained from some general knowledge about the appearance of roofs in Gothic churches in a certain region. Then, based on this limited amount of information, a graphical representation of the church may be calculated based on the thus established appearance control data which has a high recognition value.

A method according to and aspect of the invention may further comprise displaying the generated graphical representation of the building in an electronic map.

According to a further aspect, a method for generating a database containing appearance control data comprising information on parameterized architectural features of buildings and building blocks which are fragments of the buildings is provided. The method comprises generating parameterization information of the building based on information selected from the group comprising: type of building, architectural classification of the building, geographical position of the building, and image data. The method further comprises fractioning of the building into building blocks based on the parameterization information and generating and storing in the database the appearance control data based on the parameterization information in building blocks.

By generating parameterization information of the building based on a limited amount of information such as type of building, architectural classification of the building, geographical position of the building, and image data, it is possible to reduce the efforts needed for generating the database containing the appearance control data. Yet, at the same time, the appearance control data can be generated such that the recognition value of the graphical representation specified by the appearance control data contained in the database is high.

As outlined above, the architectural classification of a building together with a limited amount of image data can be used to efficiently generate parameterization information of the building. The image data may, for example, include aerial images and low-resolution images taken from a moving vehicle.

Because generation of a database containing appearance control data relies only on comparably easily obtainable information and a set of prefabricated and parameterized building blocks, it may be possible to provide appearance control data for a large amount of buildings. For example, in an electronic map, the number of points of interest (POI) which are depicted using a 3D graphical representation of the POI may increase significantly. As outlined above, this is also because the computational efforts and memory requirements are significantly reduced.

It may be possible that at least one of the following occurs automatically: generating the parameterization information, fractioning of the building based on predefined parameterization function linking parameterization information to building blocks. When the amount of factors influencing the generation of parameterization information of a building is reduced/minimized and, moreover, a predefined set of building blocks is used to fraction the building, these operations may be performed automatically, or at least partially automatically, which decreases the amount of efforts needed in terms of time and money.

For example, the parameterization information may be automatically or partially automatically generated for a number of buildings within a certain geographic area. Typically, within a certain geographic area, the appearance of buildings does not change significantly, e.g., houses within southern Germany can be classified using a large number of common characterizing architectural features.

Moreover, the parameterization function may comprise randomized contributions which are randomly fractioning the building into building blocks within predefined margins. By doing so, it may be ensured that when automatically generating parameterization information and building blocks, not every building within an electronic map accordingly generated looks the same. For example, in a residential area, different residential homes may have a slightly different appearance. This allows to generate a more heterogeneous and by this a more realistic representation of a geographic area while still a high degree of atomization is used in generating the database containing the appearance control data.

According to a further aspect, a vehicle navigation system is provided. The vehicle navigation system comprises a database comprising appearance control data comprising information on parameterized architectural features of building and building blocks which are fragments of the building, and template data relating to a graphical representation of the building blocks, a graphical processor which is configured to calculate a 3D graphical representation of the building blocks based on the respective template control data and the appearance control data, and which is configured to combine a 3D graphical representation of the building blocks based on the appearance control data to generate a 3D graphical representation of the building. The vehicle navigation system further comprises a display, which is configured to display an electronic map containing the 3D graphical representation of the building.

These and other objects, features and advantages of the present invention will become apparent in light of the detailed description of the embodiments thereof, as illustrated in the accompanying drawings. In the figures, like reference numerals designate corresponding parts.

DESCRIPTION OF THE DRAWINGS

Embodiments of the invention will be described in further detail below with reference to the accompanying drawings. In these drawings.

DETAILED DESCRIPTION OF THE INVENTION

Figure 1:
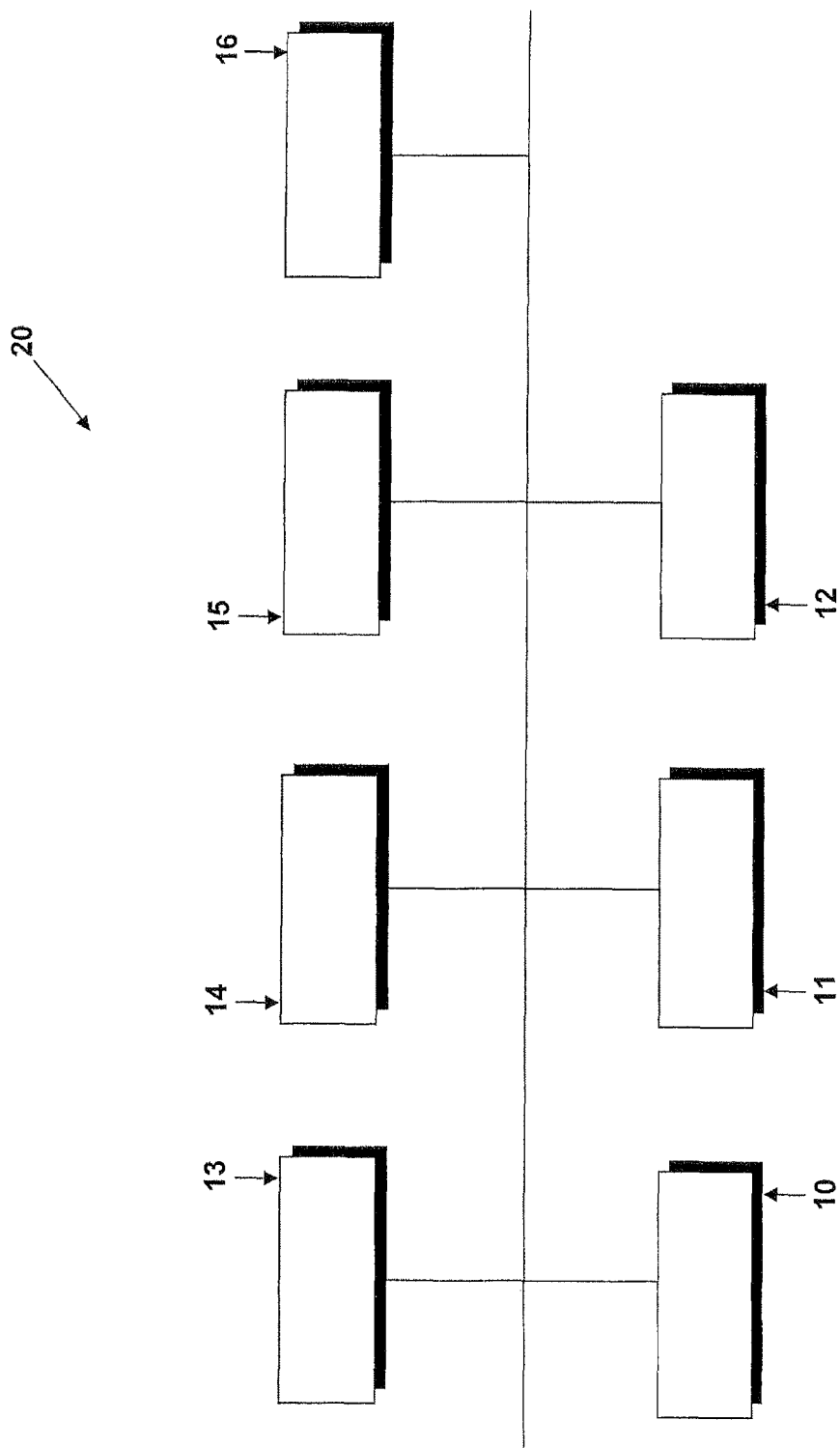
FIG. 1 is a block diagram illustration of a vehicle navigation system.

FIG. 1 is a block diagram illustration of a vehicle navigation system 20. The vehicle navigation system 20 comprises two databases 10, 11, a graphical processor 12, a display 13, a human interface device 14, a digital map database 15, and a processor 16.

The database 10 contains appearance control data comprising information on parameterized architectural features on different buildings and on building blocks which are fragments of the building. The database 11 contains template data, wherein the different template data relates to prefabricated graphical representations of the building blocks. The building blocks relate to, for example, the ground floor, the roof, the tower, and the building extension of a certain building. The number and the type of the different building blocks varies from building to building. The type of a building block is identified via type information. Both, the type information and the number of building blocks is contained in the appearance control data, which is saved in the database 10.

A 3D graphical representation of a building is obtained by calculating, first, a 3D graphical representation of each building block as referenced by the appearance control data in the graphical processor (GPU) 12. Here, the template data may relate to two-dimensional shapes or even three-dimensional models. Then, because the template data already relates to a prefabricated graphical representation of the individual building blocks as referenced by the appearance control data, the GPU 12 only needs to perform a limited amount of computational steps of reduced computational effort in order to obtain a graphical representation of different building blocks. Such computational operations may include extruding of the two-dimensional shapes to obtain 3D models and scaling, rotating, skewing, coloring or texturing of the 3D models. Which of those operations is performed in what manner is specified by the appearance control data, which may comprise information on the width, depth, height, color, texturing, rotation, and symmetry of the different building blocks. Typically, as each computational step only needs limited computational resources, the computational efforts of the GPU 12 are reduced. Then, the GPU 12 may, for example, calculate a graphical representation of a larger number of buildings, because the computational efforts for calculating each individual graphical representation is reduced.

Once the 3D graphical representations of the different building blocks is obtained in such a manner, the appearance control data stored in the database 10 also comprises information on the relative position of a building block with respect to other building blocks and an overall geographical position of the building. For example, there can exist a reference building block, e.g., in the form of a building block with type information "ground floor", with an associated absolute geographical position. The absolute position refers to a geographical position of the building for which the graphical representation is generated and later on displayed in an electronic map on the display 13. Also, the relative position of the other building blocks is specified with respect to the reference building block. Then it is possible that the GPU 12 combines and arranges the different 3D graphical representations of the building blocks in order to obtain a 3D graphical representation of the overall building.

It should be understood that it is possible to perform some of the graphical operations as outlined above with respect to the 3D graphical representation of a building block, e.g., scaling, rotating, skewing, et cetera, also for the 3D graphical representation of the building.

The graphical representation of the building can be displayed in an electronic map on the display 13. Via the human interface device 14, a user may specify the field of view of the electronic map or the virtual angle under which the electronic map is displayed. Such parameters influence the depiction of a graphical representation of a building as calculated by the graphical processor 12. For example, if the field of view of the electronic map relates to a smaller magnification, the scale of the graphical representation of a building needs to be accordingly adapted. Accordingly, if the viewing angle changes, the viewing angle on the 3D graphical representation changes as well.

Typically certain features of the electronic map are displayed in a three-dimensional fashion. Because the viewing angle can be adapted (e.g., via the human interface device 14) it is necessary to provision a 3D model of 3D features such as the buildings. This is because, if the viewing angle changes, the perspective under which the graphical representation of a building is depicted changes as well. Then, if a 3D model is available, the new graphical representation can be easily calculated and obtained based on a 3D model and the viewing angle.

The processor 16 controls the interaction between the different entities of the vehicle navigation system 20. For example, the processor 16 controls the delivery of the input from the human interface device 14 to the graphical processor 12 and from the graphical processor 12 to the display 13.

Even though the different entities of FIG. 1 are described and discussed separately, it should be understood that different entities may be combined in one unit. Different entities may be further implemented as hardware or software or a combination thereof In FIG. 2, a graphical representation of two buildings 1 is depicted. Such a graphical representation may be, for example, used in connection with an electronic map as displayed on the display 13 of FIG. 1. The buildings 1 may be churches. On the left-hand side, the building 1 comprises a ground floor 2, a roof 3, a tower 4, and a building extension 5 in the form of an apsis. For example, the ground floor 2 has a rectangular shape.

Figure 2:
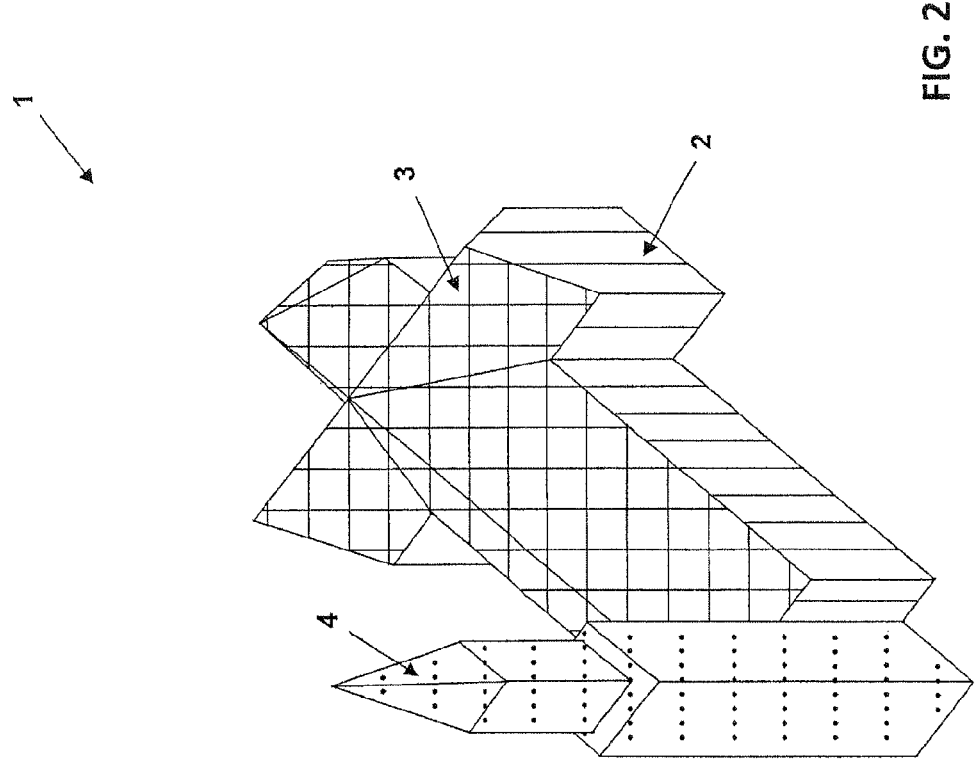
FIG. 2 illustrates a graphical illustration of a 3D graphical representation of a building.
Figure 2:
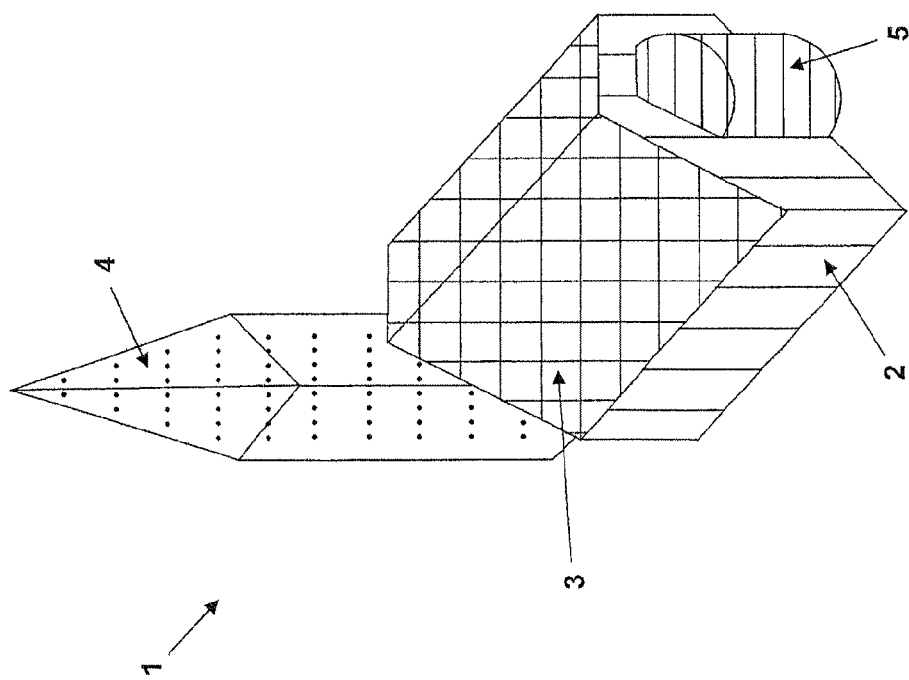

Differently, the church depicted on the right-hand side of FIG. 2 has a ground floor 2, which has a more sophisticated shape. This is because the graphical representation of the building 1 comprises a transept. Therefore, the ground floor 2 is in the form of a cross. Also, the roof 3 is accordingly adapted. The tower 4 is also of different shape. Nonetheless, the amount and the type of the individual building blocks remains the same for the two depicted buildings 1 in FIG. 2.

The two buildings 1 in the form of churches as depicted in FIG. 2 are both assembled from basic building blocks based on architectural features. This will be explained in further detail below. However, as can be seen from FIG. 2, even though a limited amount of underlying building blocks is used to assemble the full building, a high recognition value can be achieved. The user can easily identify the building as a church or cathedral. It is even possible to distinguish the appearance of the two buildings as depicted in FIG. 2 from each other.

Figure 3:
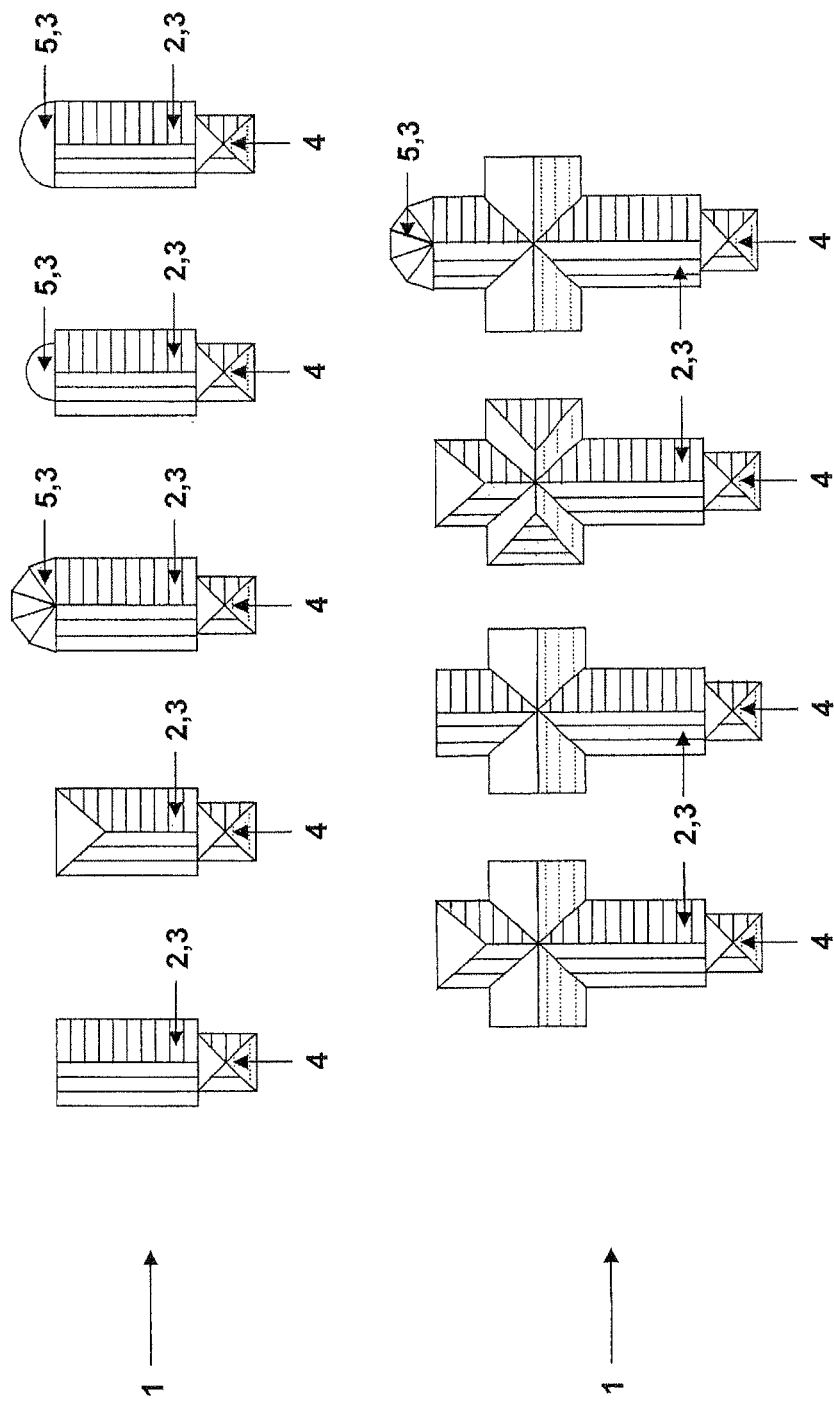
FIG. 3 illustrates different combinations of building blocks of a graphical representation of a building.

With respect to FIG. 3, further configurations of building blocks are illustrated exemplarily for churches. It can be seen from FIG. 3 that, by varying the template data referring to the different building blocks, a wide variety of different graphical representation of churches can be achieved. In FIG. 3, nine graphical representations of churches using only the basic building blocks with template data of type information ground floor 2, tower 4, roof 3, and building extension 5 are depicted. The individual shape, orientation, and arrangement of different building blocks is varied, however. This results in a changing graphical representation.

By using the limited amount of template data for providing the different building blocks, it is possible to obtain a graphical representation of the building 1, in the case of FIGS. 2 and 3 the church, which has a high recognition value. This is because the template data is not chosen according to basic geometrical shapes such as polygons or geometrical parameters, but rather according to elements of the faunal language of architectural features.

Figure 4:
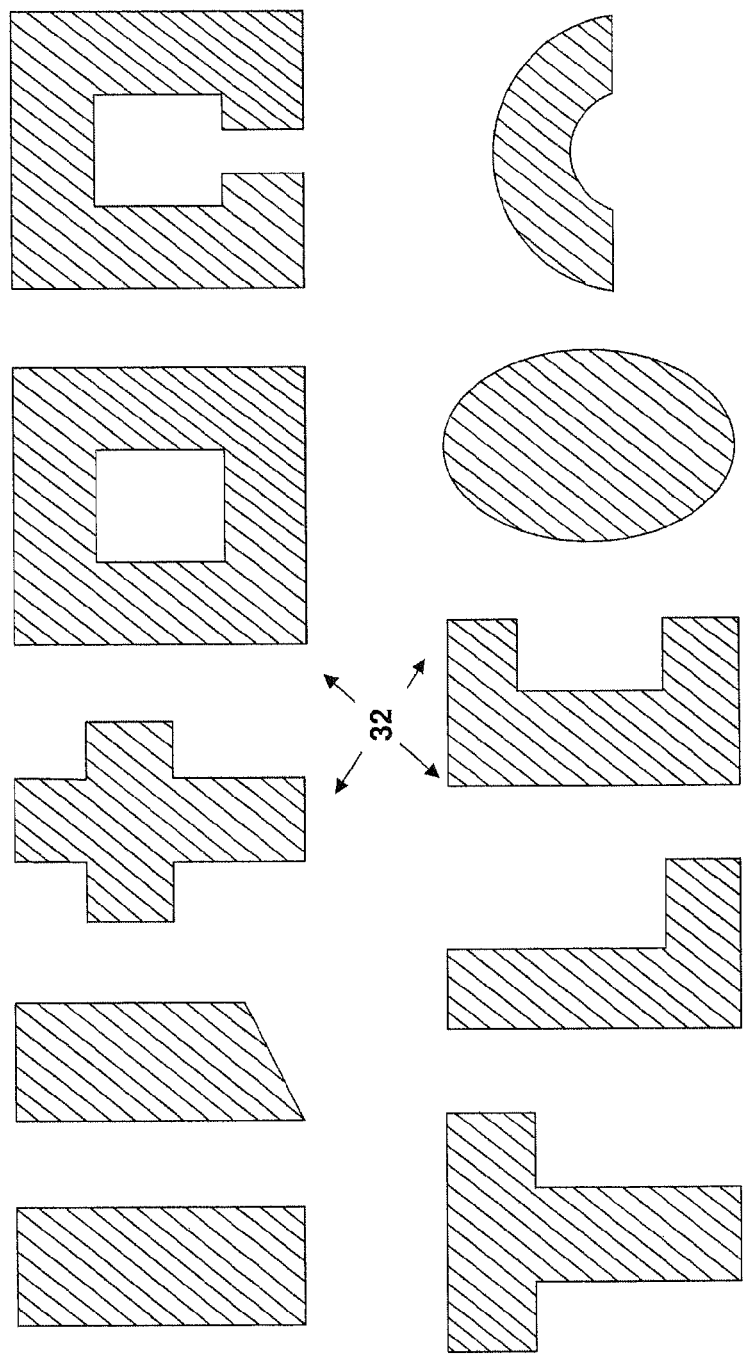
FIG. 4 illustrates different template data with type information "ground floor"
Figure 5:
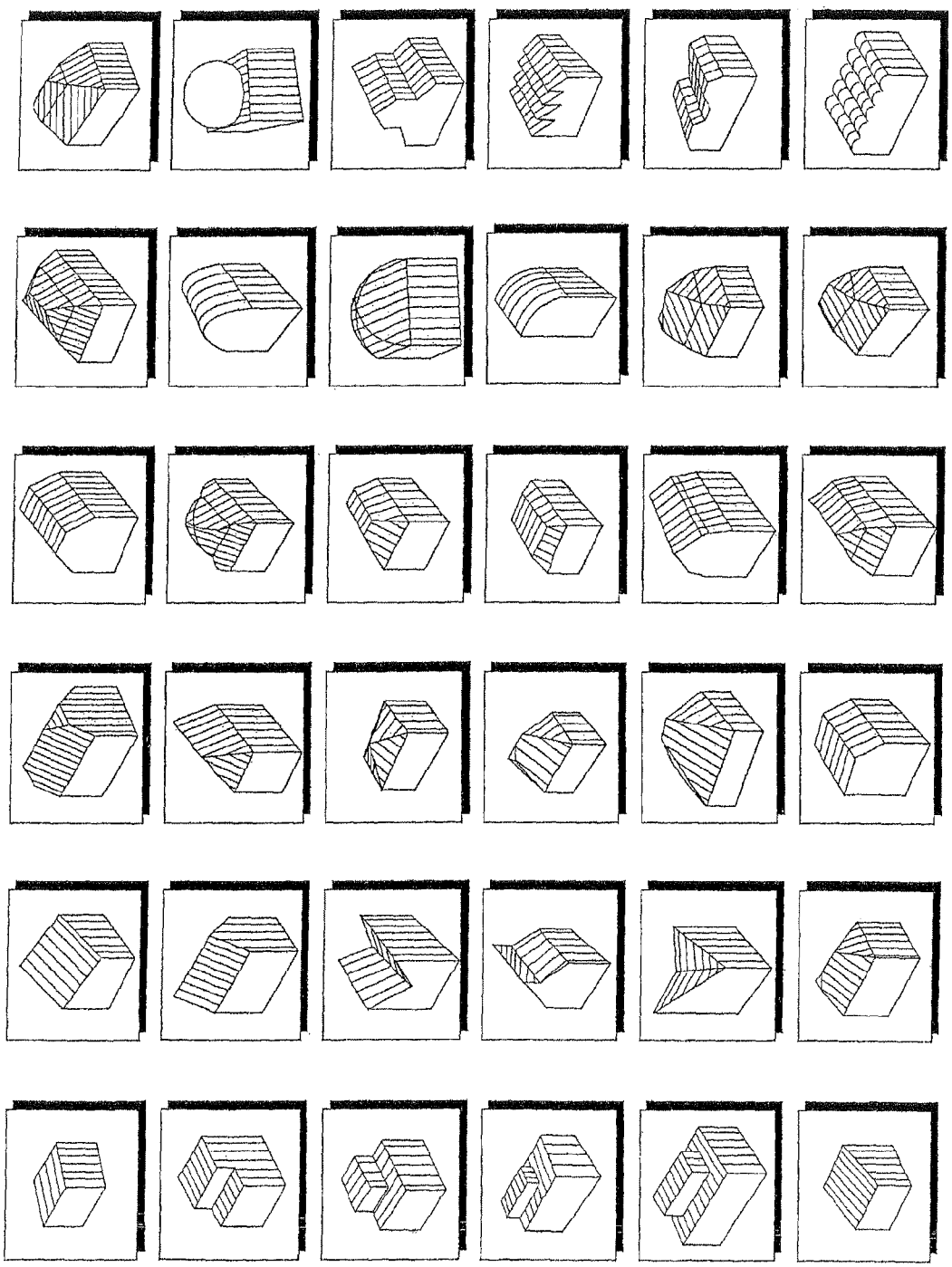
FIG. 5 illustrates different template data with type information "roof"
Figure 6:
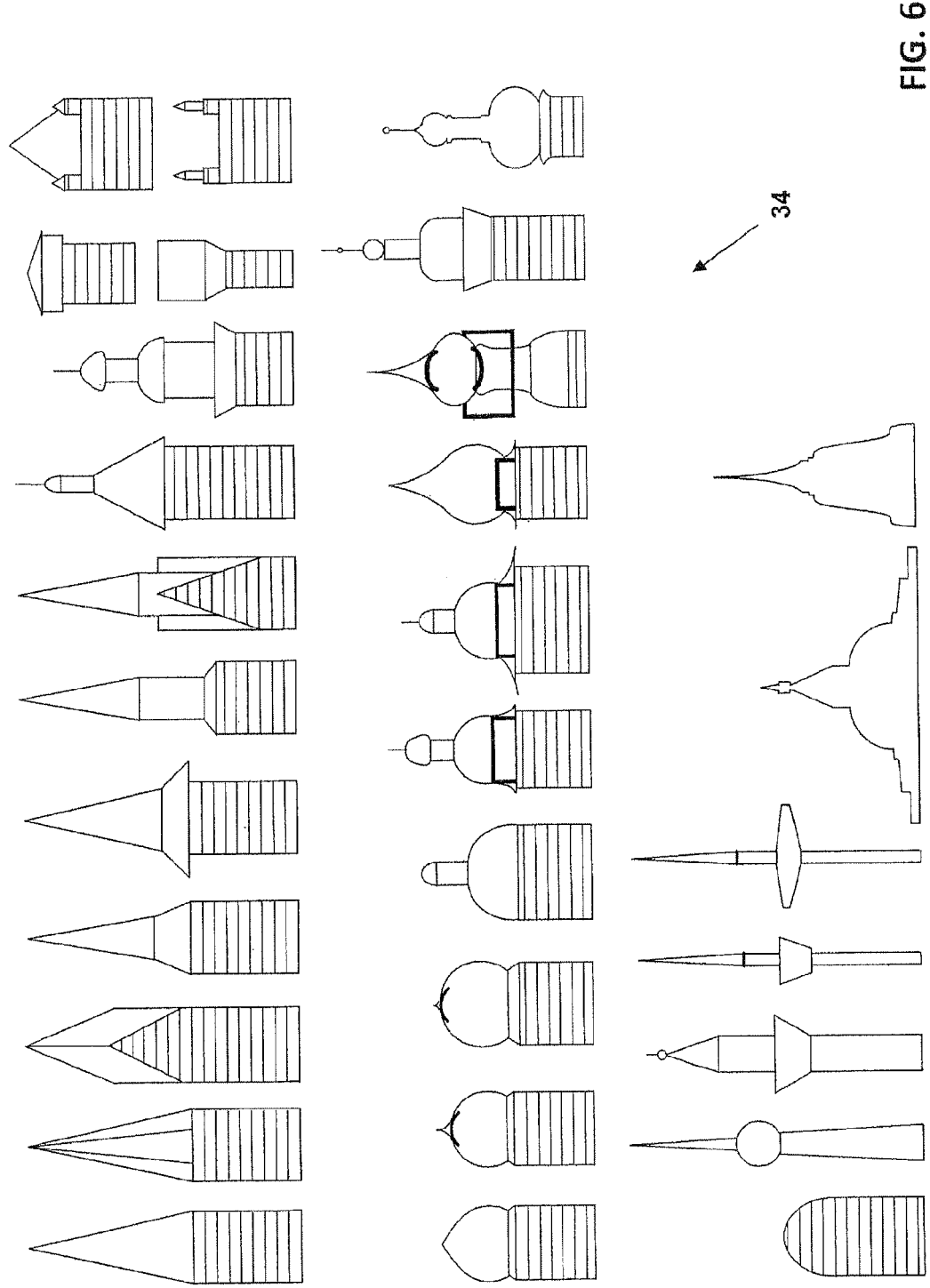
FIG. 6 illustrates different template data with type information "tower"

With respect to FIGS. 4, 5, and 6, the possibilities for template data with different type information is illustrated in further detail and individually for different type information. For example, with respect to FIG. 4, template data 32 relating to type information "ground floor" is depicted. As can be seen, the template data 32 relates to two-dimensional shapes with a wide variety of different appearance. For example, a simple rectangular shape or cross-shaped template data is provided. T-shaped, L-shaped, or circular shaped template data is also provided amongst others. From such prefabricated basic template data, which is based on the formal language of architectural features of certain buildings, it is possible to provide and calculate graphical representations of building blocks. In particular, it is possible to standardize and predefine the template data. This results in a failsafe method for generating a graphical representation of a building.

With respect to FIG. 5, different template data for roofs is displayed. As can be seen, a wide variety of 36 different 3D models of roofs is provided. Those 3D models of roofs can be readily combined with a 3D model of a ground floor, e.g., obtained via extruding the two-dimensional shapes as depicted in FIG. 4. The different roofs are based on the formal language of architectural features. For example, roofs for places of worship, residential homes, industry buildings, etc. are provided. Therefore, just by combining the 3D model of the ground floor with a 3D model of the roof, a high recognition value can be obtained.

In FIG. 6, template data 34 for towers is depicted. In this case the template data refers to two-dimensional shapes defining the vertical cross-section of towers. It should be understood that instead of providing such two-dimensional shapes of the towers, the template data 34 may also be present in the form of three-dimensional models. The cross-sectional two-dimensional shapes of the template data 34 can be transformed into three-dimensional template data, e.g., 3D models of the towers, by operations such as extrusion or rotation of the two-dimensional shapes.

As can be seen from FIG. 6, again the template data 34 is based on the formal language of architectural features. Different shapes of towers are used which are created based on architectural features of certain periods of building history. For example, the different template data 34 corresponds to towers which are typical for different centuries in different areas of the world (romanesque, gothic, islamic, medieval etc.). By doing so, it is easy to obtain a graphical representation of a building that provides to a user a high recognition value in combination with the real building.

Figure 7:
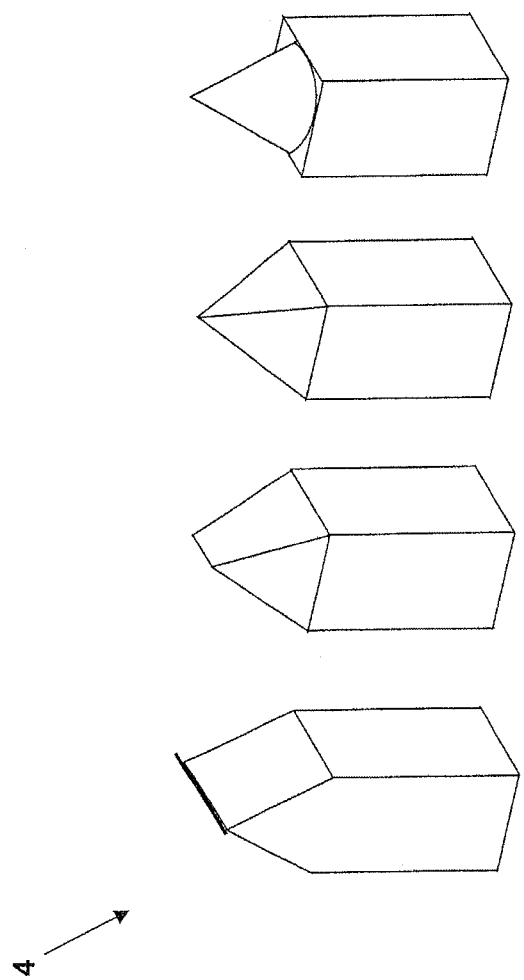
FIG. 7 illustrates different building blocks in the form of 3D models.

In FIG. 7, different 3D models of the building blocks 4, in this example towers, are depicted. This illustrates the transition from the two-dimensional shapes of FIG. 6 to a 3D dimensional model of the building block in FIG. 7. For example, the 3D models in FIG. 7 can be obtained from rotation of the 2D shapes in FIG. 6. Also, by different symmetry operations with respect to the roof, different graphical representations can be obtained. In any case, the computational efforts needed to calculate the graphical representation in the form of the 3D model of the template data 4 is reduced.

Figure 8:
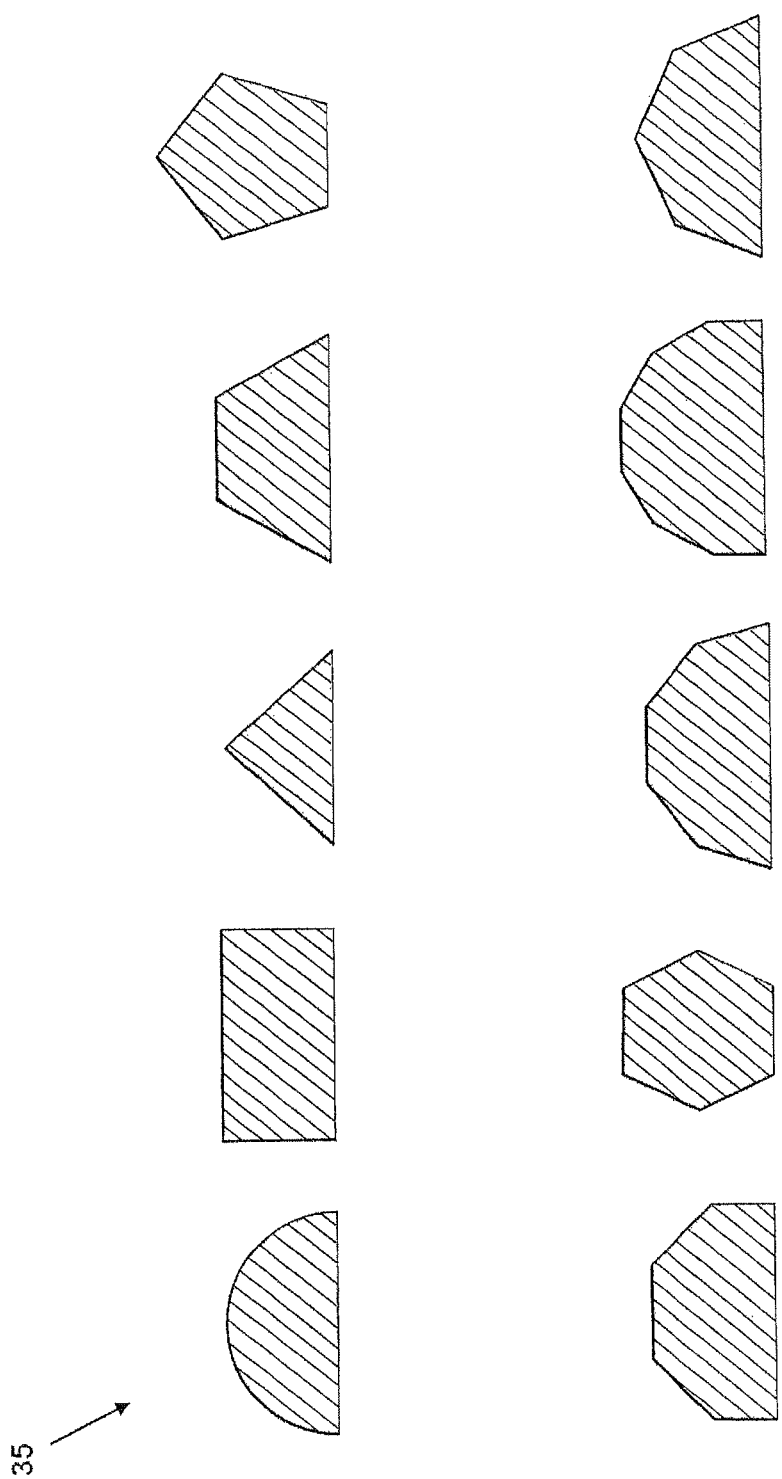
FIG. 8 illustrates different template data with type information "extension"

With respect to FIG. 8, template data 35 relating to building extensions is depicted. Here typically the ground floor is extended by certain building extensions. Also in the case of FIG. 8, the template data 35 is present in the form of two-dimensional shapes. Via the appropriate graphical operations, e.g., extrusion, the two-dimensional shapes of the template data 35 can be transformed into three-dimensional models of the building block. From this, a graphical representation can be calculated for the building block and later on combined in order to generate a three-dimensional graphical representation of the entire building.

Figure 9:
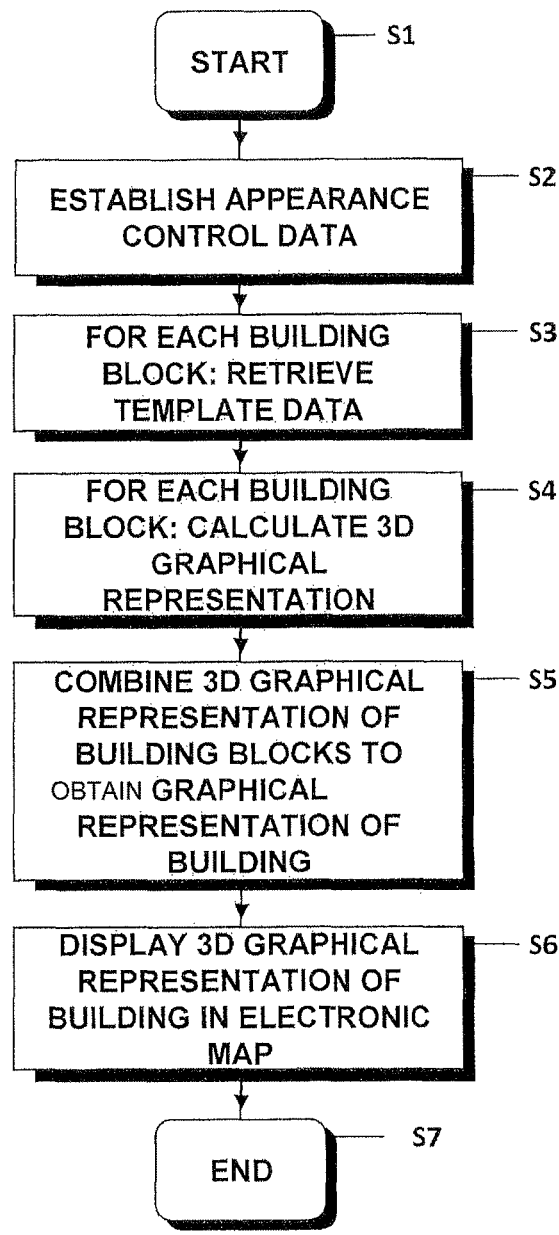
FIG. 9 is a flowchart according to an aspect of the invention.

In FIG. 9, a flowchart illustrating a method according to an aspect of the present invention is depicted. The method starts in step S1. In step S2, the appearance control data is established. It is possible, e.g., to obtain the appearance control data of a certain building from a database. Also, according to a further aspect, it is possible to generate the appearance control data based on limited input, such as image data, the type of the building, the architectural classification of the building and the geographical position of the building. For example, by determining the geographical position of the building and certain image data, it is possible to automatically determine some architectural classification of the building. For example, the architectural classification may specify a Romanesque church, a residential home or the like. Based on such an architectural classification and the geographical position of the building, it is possible to, e.g., automatically or semi-automatically, draw conclusions on some architectural features of the building. For example, typically places of worship will look different in Europe than in Asia. Also, e.g., residential homes in a suburban area will look different to residential homes in some center district of the city. Therefore, from such input, it is possible to establish appearance control data. More details on step S2, i.e., the establishing of appearance control data, is provided in FIG. 10 and will be discussed further below.

Referring still to FIG. 9, in step S3, for each building block template data is retrieved. For example, the template data can be retrieved from a database based on some information on the number and the type of the building block comprising the appearance control data. For example, the appearance control data can comprise the information that a building has four towers which are positioned at the corners of some square-shaped ground floor. The different towers may be further specified by the appearance control data, for example by providing references to certain template data. As explained in detail with respect to FIG. 6, different template data may be provisioned for different towers. Once the template data is retrieved in step S3, in step S4, a 3D graphical representation is calculated for each building block.

Calculating the 3D graphical representation in step S4 comprises, optionally, calculating a 3D model of the building block. It is also possible that the template data is already present in the form of a 3D model. Once the 3D model is obtained, the 3D model may be additionally scaled, skewed, rotated, colored, or textured. By performing such operations, it is, first, ensured that later on the different building blocks can be readily combined to the graphical representation of the main building, and second, ensured that the 3D model of a building block is further adapted in order to better match the real building. This increases the recognition value. Which of these operations is performed in the manner specified in the appearance control data.

In step S5, the 3D graphical representations of the building blocks are combined to obtain a 3D graphical representation of the building. For example, a relative orientation and positioning of the different building blocks is specified within the appearance control data. Then, it is possible, based on this specification, to position and align different building blocks with respect to each other.

In step S6, a 3D graphical representation of the building is depicted in an electronic map. Typically, this includes determining a viewing angle and based on the viewing angle calculating a particular 2D view on the 3D graphical representation. The geographical position of the building for which the 3D graphical representation has been calculated, is also specified in the appearance control data or in a digital map database. This is used to depict the graphical representation at the correct position in the electronic map. Then, the method terminates in step S7.

Figure 10:
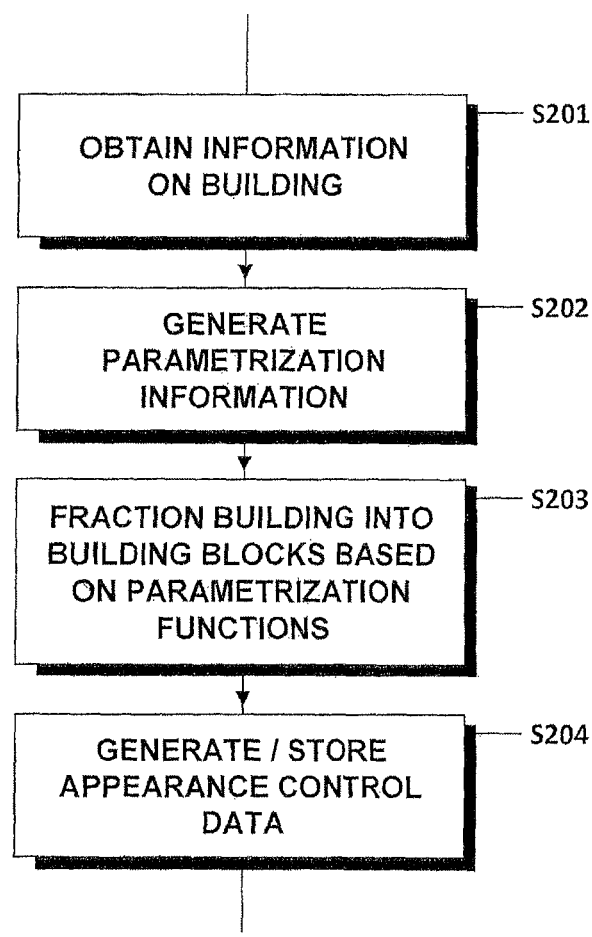
FIG. 10 is a flowchart according to a further aspect of the invention.

With respect to FIG. 10, the step S2 of FIG. 9, is discussed in further detail. Step S2 of FIG. 9 may comprise the steps S201 to step S204 of FIG. 10. While the database containing the appearance control data may be provided within a vehicle, the generation of this database may be performed separately. For example it is possible to perform steps S201-S204 when generating the database.

In step S201, information on a certain building is obtained. Such information may include the type of the building, the architectural classification of the building, the geographical position of the building, and image data. In particular, for example, the image data can be low-resolution image data (e.g., taken from a moving vehicle). Typically, image data taken from a moving vehicle is used.

The type of the building refers, for example, to place of worship or residential home, etc. The architectural classification of the building specifies in further detail the type of the building, for example, "Gothic church" or "Western style residential home". The geographical position of the building can be also used to obtain some architectural classification of the building.

Based on the information obtained in step S201, in step S202 parameterization information is generated. The parameterization information translates the information obtained in step S202 into parameterized architectural features. For example, a set of different parameterization information is specified in some database. Then, in step S202, the one parameterization information is selected, which matches, based on an evaluation of the information obtained in step S201, the real building most closely.

Based on the parameterization information, in step S203 the building is fractioned into building blocks. For example, the fractioning can be performed using predefined parameterization function. The parameterization function can specify which building blocks are used to generate the graphical representation of a certain building. For example, the building blocks that are necessary for generating a graphical representation of a church will in general be very different for the building blocks that are necessary for generating a graphical representation of, for example, a residential home.

In particular, it is possible to automatically generate the parameterization information in step S202 and automatically faction the building into building blocks in step S203. This can be useful if it is necessary to establish appearance control data for a large number of buildings. This may be the case when generating a database for the usage in connection with some digital map database. Then, when the different steps are performed automatically, it is possible to establish appearance control data for many buildings within a short period of time.

In particular, step S203 may comprise parameterization functions which comprise randomized contributions which are, to some larger or smaller degree, randomly fractioning the building into building blocks within predefined margins. As discussed, for example, with respect to FIG. 3, the same type of building may have many different graphical representations. In the example of FIG. 3, for a certain church nine graphical representations were calculated. All of those nine graphical representations comprise a building block of the type tower. The various other building blocks had some variation in the particular appearance. For example, it may be possible to have some random contributions to the parameterization functions such that not all buildings with the same parameterization information, which was obtained in step S202, have the same graphical representation. In the example of FIG. 3, not all churches comprise an apsis and, also, the roof of the different graphical representations showed some variance. This may cause some variation of the graphical representations of the buildings of comparable type. A more realistic electronic map may be accordingly obtained.

In step S204, the appearance control data is generated and stored, for example, in a database.

While devices and methods according to embodiments have been described in detail, modifications may be implemented in other embodiments.

Although the present invention has been illustrated and described with respect to several preferred embodiments thereof, various changes, omissions and additions to the form and detail thereof, may be made therein, without departing from the spirit and scope of the invention.

What is claimed is:

1. A method of generating a three-dimensional (3D) graphical representation of a first building and of a second building, the method comprising for each one of the first and second buildings:

establishing building-specific appearance control data comprising information on parameterized architectural features of the respective building and on building blocks which are fragments of the respective building;

retrieving template data from a database based on references in the appearance control data, wherein the template data relates to a prefabricated graphical representation of the building blocks;

for each building block, calculating a 3D graphical representation of the building block based on the respective template data and the appearance control data; and combining the 3D graphical representations of the building blocks based on the appearance control data to generate the 3D graphical representation of the respective building;

wherein the appearance control data comprises information indicative of number of building blocks used for the 3D graphical representation and type information for the building blocks referencing the template data, wherein the template data is selected from the group comprising two-dimensional shapes and 3D models, wherein the step of combining the 3D graphical representations of the building blocks comprises arranging and attaching the 3D models of the building blocks to each other based on the appearance control data, wherein at least some of the building blocks are the same for the first building and the second building, wherein the template data stores a single copy of the graphical representations of the at least some of the building blocks that are the same for the first building and the second building.

2. The method of claim 1, wherein for at least one building block the type information relates the building block to a fragment of the building selected from the group comprising ground floor, roof, tower, and building extension.

3. The method of claim 2, wherein the appearance control data comprises information for at least one building block selected from a group comprising width, depth, height, color, texturing, rotation, symmetry, relative position to other building blocks, and geographical position.

4. The method of claim 1, wherein the step of calculating the 3D graphical representation of a building block comprises, based on the appearance control data, rendering a 3D model of the building block by extruding the two-dimensional shape of the respective template data which is referenced by the appearance control data.

5. The method of claim 1, wherein the step of calculating the 3D graphical representation of a building block comprises, based on the appearance control data, at least one operation performed on a 3D model of the building block which is selected from the group comprising scaling, rotating, skewing, coloring, and texturing.

6. The method of claim 1, wherein the appearance control data is established based on elements selected from the group comprising type of building, architectural classification of the building, geographical position of building, and image data.

7. The method of claim 1, further comprising
displaying the generated 3D graphical representation of the building in an electronic map.

8. A method for generating a database containing appearance control data comprising information on parameterized architectural features of a plurality of buildings and building blocks which are fragments of the plurality of buildings, the method comprising for each one of the plurality of buildings:

generating parameterization information of the respective building based on information selected from the group comprising type of respective building, architectural classification of the respective building, geographical position of the respective building, and image data;

subdividing the respective building into building blocks based on the parameterization information;

generating and storing in the database the appearance control data based on the parameterization information and building blocks, the appearance control data comprising information on how to arrange and attach 3D models of the building blocks to each other and further comprising references to the building blocks;

storing in the database template data comprising a prefabricated graphical representation of the building blocks for the plurality of buildings, wherein the template data stores a single copy of the graphical representation of the building blocks that are the same for the plurality of buildings.

9. The method according to claim 8, wherein at least one of the following occurs automatically (i) generating the parameterization information, (ii) fractioning of the building based on predefined parameterization functions, or (iii) linking parameterization information to building blocks.

10. A vehicle navigation system, comprising:

a database comprising building-specific appearance control data comprising information on parameterized architectural features of a plurality of buildings and building blocks which are indicative of exterior structural features of the plurality of buildings, and template data relating to a prefabricated graphical representation indicative of the building blocks;

a processor configured to calculate, for each one of the plurality of buildings, a perspective graphical representation of the building blocks based on the respective template data and the respective appearance control data, and to combine the perspective graphical representations of the building blocks based on the appearance control data to generate a perspective graphical representation of the respective building, wherein the appearance control data comprises for each one of the plurality of buildings at least the following information (i) number of building blocks used for the perspective graphical representation and (ii) type information for the building blocks referencing the template data; and a display which is configured to display an electronic map including the perspective graphical representation of the plurality of buildings, wherein the template data is selected from the group comprising two-dimensional shapes and 3D models, wherein the processor is configured to combine the 3D graphical representation of the building blocks by arranging and attaching the 3D models of the building blocks to each other based on the appearance control data, wherein at least some of the building blocks are the same for a first of the plurality of buildings and a second of the plurality of buildings, wherein the template data stores a single copy of the building blocks that are the same for the first building and the second building.

11. The vehicle navigation system of claim 10, wherein the processor comprises a graphical processor unit.

12. The vehicle navigation system of claim 10, comprising a digital map database that includes the electronic map data.

13. The vehicle navigation system of claim 11, wherein the building blocks which are indicative of exterior structural features of the building comprises ground floor building block information and roof building block information.

14. The vehicle navigation system of claim 13, wherein the building block information comprises type data indicative of whether the respective building associated with the building block information is a residential, commercial or religious building.

15. The vehicle navigation system of claim 13, wherein for each of the building blocks the template data comprises an associated library of basic shapes selectable as constituent exterior structural features associated with the particular building block.

* * * * *